Nov. 1, 1966 R. B. RUNKLE 3,283,118
RESISTANCE WELDED HONEYCOMB CORE AND METHOD OF
AND MACHINE FOR MAKING SAME
Filed Dec. 10, 1956 11 Sheets-Sheet 1

INVENTOR.
RAYMOND B. RUNKLE
BY
Townsend and Townsend
ATTORNEYS

Fig. 5

INVENTOR.
RAYMOND B. RUNKLE
BY Townsend and Townsend
ATTORNEYS

INVENTOR.
RAYMOND B. RUNKLE
BY
Townsend and Townsend
ATTORNEYS

Nov. 1, 1966

R. B. RUNKLE

3,283,118

RESISTANCE WELDED HONEYCOMB CORE AND METHOD OF
AND MACHINE FOR MAKING SAME

Filed Dec. 10, 1956

INVENTOR.
RAYMOND B. RUNKLE
BY
Townsend and Townsend
ATTORNEYS

Nov. 1, 1966  R. B. RUNKLE  3,283,118
RESISTANCE WELDED HONEYCOMB CORE AND METHOD OF
AND MACHINE FOR MAKING SAME
Filed Dec. 10, 1956  11 Sheets-Sheet 10

INVENTOR.
RAYMOND B. RUNKLE
BY
Townsend and Townsend
ATTORNEYS

United States Patent Office 3,283,118
Patented Nov. 1, 1966

3,283,118
RESISTANCE WELDED HONEYCOMB CORE AND METHOD OF AND MACHINE FOR MAKING SAME
Raymond B. Runkle, Berkeley, Calif., assignor to Hexcel Products Inc., Oakland, Calif., a corporation of California
Filed Dec. 10, 1956, Ser. No. 627,360
5 Claims. (Cl. 219—79)

This invention relates to a resistance welded honeycomb product and to a machine for and method of making the same.

In general the present invention embraces the practice of resistance welding two sheets of corrugated metal webs (such as stainless steel) having relatively high electrical resistance to form a honeycomb structure.

A principal object of this invention is to provide a novel new welding machine which will resistance weld superposed corrugated metal webs to form honeycomb core.

Another principal object of this invention is to provide a method of welding resistance welded honeycomb core by the successive superposition of corrugated metal webs one over the other for welding in phase relation to withdrawing and adding supports for predetermined superposed webs.

Another object of this invention is to provide a honeycomb cell structure of unique configuration formed of a preformed corrugated web half cells with the nodes of each web welded to adjacent nodes of adjoining webs. A particular advantage of the cell configuration is that the novel honeycomb core is provided with flats forming welding node surfaces in a configuration in which relative alignment between flats is relatively uncritical and in which welding electrodes of a fixed predetermined size may be used for nodes of cell structure within a wide range of relative sizes.

Another object and advantage of this invention is a novel honeycomb core web supporting assembly which allows successive withdrawing and replacement of core supporting electrode elements in position to supportably receive each superposed new web on the core while continually supporting the core.

Another feature and advantage of the invention is the web supporting assembly which provides a welding track elevated to a predetermined elevation for each weld phase.

A still further feature and advantage of the invention is a novel assembly which operates to free web supporting members from web engagement so that the members may be more freely withdrawn from welded core formed from the webs.

Another feature and advantage of this invention is the provision of individually electrically energized welding wheels substantially uniformly urged to provide a constant welding pressure against the webs.

A still further feature and advantage of this invention is to provide a novel arrangement to sequentially align welding electrodes to conform with predetermined staggered welding nodes of corrugated web during selected strokes of the welding wheels along the nodes.

Still another object and advantage of this invention is to provide a mechanism for transversely shifting welding electrodes to align with selected welding nodes during predetermined welding phases.

Another feature and advantage of this invention is a novel mechanism which provides a sequence of mechanical operations which allows for superposition of precorrugated metal web supports for the webs, the alignment of welding electrodes with selected nodes of the webs, the application of welding current with the application of welding electrode pressure on the webs to effect the weld and the withdrawal of supporting members and replacement thereof to facilitate further superposition of webs while retaining fabricated core in supported condition.

Other objects of the present invention will become apparent upon reading the following specification and referring to the accompanying drawings in which similar characters of reference represent corresponding parts in each of the several views.

In the drawings:

FIG. 7b is a fragmentary sectional plan of welding electrodes in relative alignment with the work area of FIG. 7a.

FIG. 8 is a cross-section of the welding apparatus taken at line 8—8 of FIG. 6.

FIG. 9 is a detailed view of the cam arrangement to control support finger elevation in the work area taken at line 9—9 of FIG. 7a.

FIG. 16 is a fragmentary sectional view of a modification of the invention for fabrication of cells of smaller size.

In advance of proceeding to a more detailed discussion of the operation of the machine in manufacturing the honeycomb product, it is appropriate to define with some specificity the nature and construction of the honeycomb material per se. FIGS. 1, 2, 3, and 4 disclose schematically and fragmentarily honeycomb sections of different commercial cell sizes such as, for example, $\frac{3}{8}''$, $\frac{1}{4}''$, $\frac{3}{16}''$ and $\frac{1}{8}''$. For purposes of greater clarity of understanding the cell sizes are all shown in greatly enlarged scale. It is noted that each of the honeycomb sections is of generally the same shape and configuration, although specific differences in the relative size and relative angular disposition of the cell defining portions will be hereinafter noted. It is observed that each honeycomb section illustrated comprises a plurality of corrugated metal webs, ribbons or sheets, as designated at 14, and that each corrugated web defines a plurality of longitudinally extending half cells, indicated at $14^a$ and $14^b$, respectively, which said half cells project alternately to opposite sides of the medial plate (indicated by the reference line R—R in the drawings) of each corrugated web. The half cells indicated at $14^a$ are of a first common configuration, and similarly all of the half cells designated at $14^b$ are of a second common configuration. For example, and referring to FIG. 1 particularly, it is observed that each of the half cells $14^a$ is formed by three angularly disposed legs $15^a$, $15^b$ and $15^c$ defining a truncated apex in plan and with the middle leg $15^c$ of each half cell defining a flat welding node. Similarly, each of the half cells $14^b$ is formed by three legs $15^a$, $15^b$ and $15^d$. Again the general configuration of each of the half cells $14^b$ is in the nature of a truncated apex and in which the middle leg $15^d$ defines a welding node.

A unitary section of honeycomb A is defined by a plurality of the corrugated sections 14 superposed on one another with the half-cells of all of the webs extending unidirectionally and with the flat nodes $15^d$ of each corrugated web resistance welded to the flat nodes $15^c$ of an adjacent web. Hence, each full cell of the unitary honeycomb structure is defined by two half-cells of the $14^a$ and $14^b$ type of configuration. Moreover, it is noted that the angular displacement between legs $15^a$ and $15^b$ of each corrugated web is relatively close to perpendicular whereby each full cell is generally rectangular or square shaped in plan with a pair of diagonally opposite corners appearing truncated—i.e., those corners of each cell defined by the flattened welding nodes $15^c$ and $15^d$.

As will also be explained in more detail hereinafter, a completed section of the honeycomb is manufactured by successively superposing and resistance welding one corrugated web 14 to another until a unitary section of honeycob dimensions is fabricated. Moreover, and as shown in the drawing, each corrugated web is inserted into the welding machine with the half-cells $14^b$ pointing inwardly or downwardly, and with the half-cells $14^a$ pointing upwardly or outwardly. Welding electrodes carried by a block E of the machine hereinafter described are adapted to always pass over the flat welding nodes $15^d$ (which define truncated positions of the half-cells $14^b$). It has been found that there are minimum practical limits for the width of the welding electrode wheels below which the welding wheels are unable to function uniformly.

Figure 1:
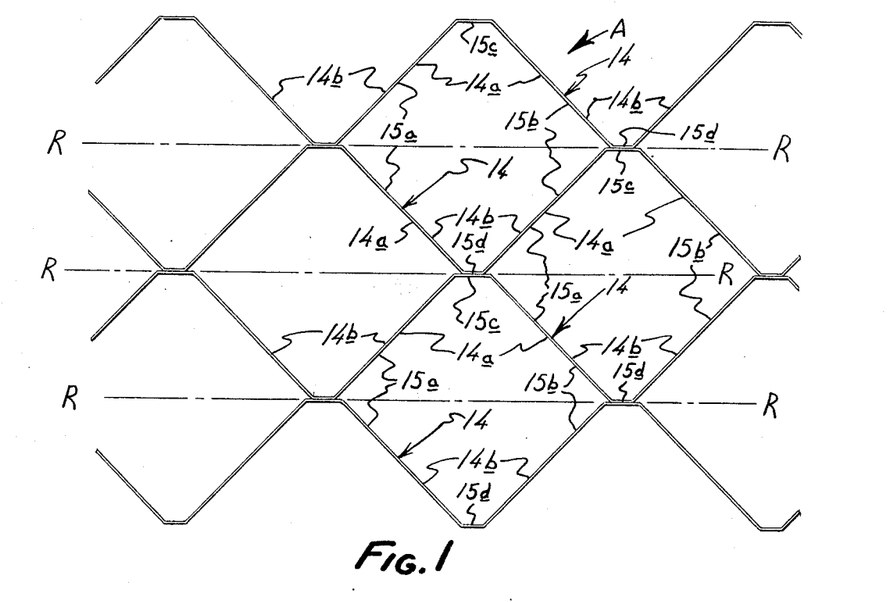
FIG. 1 is a schematic of fragmentary honeycomb core of a three-eighths inch cell.

The width of the flattened welding nodes $15^d$ is formed at least equal to or larger than the minimum practical electrode size. Because it is economically desirable to employ either identically the same, or substantially the same size, welding electrodes or wheels in the welding block E of the welding machine in the manufacture of different cell size honeycombs (such as the four commercial sizes shown in FIGS. 1-4), it is desirable and feasible to maintain the width of the flat nodes $15^d$ for all cell sizes constant. The size of the nodes $15^d$ may be slightly wider than the welding electrode wheels to provide a small margin of error so the welding wheels may track along the longitudinal axis of the nodes without making contact with the legs $15^a$ or $15^b$ even though there is a slight malignment of the wheels with respect to the nodes. This fact appears from a comparative inspection of FIGS. 1-4 in which it will be noted, for example, that the flat nodes $15^d$ of the largest honeycomb cell size as shown in FIG. 1 is equal in width to the flat nodes of $15^d$ of even the smallest cell size as shown in FIG. 4. In each case the flat $15^d$ is arranged at its smallest practical size to facilitate a wider variation of alignment between the two nodes $15^d$ and $15^c$. In the larger sized seals the larger flat $15^c$ as shown in FIGS. 1 and 3 provides wide flats to facilitate alignment with the flat nodes $15^d$.

Figure 5:
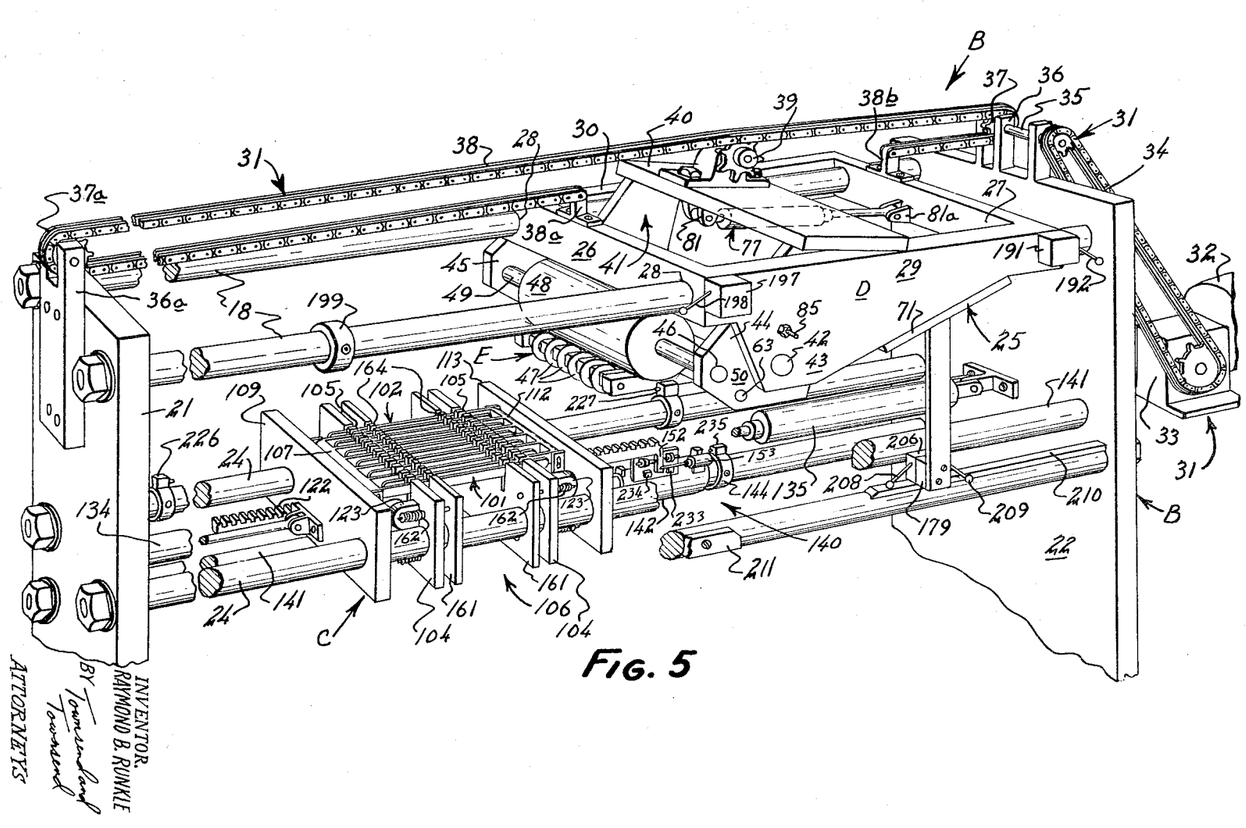
FIG. 5 is a perspective view of the welding apparatus and machine.

The webs 14 are held in alignment and then welded in the novel welding apparatus and method shown in FIG. 5 et seq.

The welding apparatus includes a main frame B, a web supporting assembly C mounted on lower portion of the frame B to align, support and hold webs 14 in place for welding, and a welding electrode supporting carriage D reciprocally mounted on the upper portion of the frame B to traverse the ribbon supporting assembly with the block of welding electrodes E positioned to effect welds of webs 14 during traverse of the carriage.

The main frame B comprises a carriage supporting way 18 composed of two parallel spaced apart drill rods mounted at opposite ends on main frame front wall 21 and rear wall 22. The web supporting assembly C is supported under way 18 by a web support assembly way 24 similarly composed of two parallel spaced apart drill rods mounted at opposite ends to the front wall and rear walls 21 and 22 respectively.

Carriage D is provided with a carriage frame 25, rectangular in plan, formed with a front plate 26 and rear plate 27 both apertured as at 28 to slidably receive the drill rods of way 18. Side plates 29 and 30, arranged exteriorly of way 18, join the front and rear plates in parallel spaced apart relation and apertures 28 form a bearing support for the carriage frame 25 to enable the frame to reciprocally slide on way 18 between front and rear walls 21 and 22.

Reciprocating motion of carriage main frame 25 with respect to the front and rear walls 21 and 22 respectively is caused by a motor driven chain drive mechanism 31. The mechanism drive motor 32 is mounted exteriorally of rear wall 22 and is provided with an electrically controlled forward-reverse clutch 33 which drives a sprocket chain combination 34 to drive an idler shaft 35 mounted by a bracket 36 on rear wall 22. A sprocket 37 is journaled on shaft 35 and a sprocket $37^a$ is pivotally mounted by mount $36^a$ on front wall 21. A chain 38 is stretched to traverse between the two sprockets with one end of the chain connected to the front plate 26 as at $38^a$ and the other end of the chain connected to the rear plate 27 as at $38^b$ so the main frame B is reciprocally driven by the chain. An idler sprocket 39 is mounted on a plate 40 extending transverse across the carriage D to prevent engagement between the plate and chain which might otherwise jam the machine.

Carriage main frame 25 houses a secondary frame 41 which is pivotally and slidably supported on an axle 42 mounted on depending arm 43 of side plates 29 and 30.

Plate 40 holds two side walls 44 and 45 of the secondary frame 41 in spaced parallel alignment in co-planar relation with the interior surfaces of side plates 29 and 30. Side walls 44 and 45 respectively are apertured as at 46 to form a slidable bearing support for the axle 42 to enable the secondary carriage 41 to be rotated about the axle and to be reciprocally moved between main carriage side walls 29 and 30.

The welding electrode block E is mounted on the lower portion of the sub or secondary frame 41. A plurality of copper alloyed welding electrode wheels 47 project forward from block E in relative co-planar spaced relation positioned to engage web support assembly C upon the sub frame being rotated in a counterclockwise direction as viewed in FIG. 45. A resilient solid rubber covered roller 48 is rotatably mounted over the welding wheels on the front portion of the sub frame 41 forward of the sub frame axle 42 to rotatably engage the top of the welding wheels and urge them downwardly while the wheels are in engagement with the support assembly C. Rubber roller 48 is rotatably mounted by a supporting axle 49 carried by a forwardly projecting section 50 of side walls 44 and 45.

The electrode block E more specifically is slidably carried by two parallel spaced channel members 51 mounted on opposite ends on walls 44 and 45 directly under axle 42. Block E is slidably supported from the member 51 by a T-shaped slide member 52 with a body portion 53, having a width approximately the distance between the two channels 51, fitted between the channels. The two outwardly extending arms 54 of the member 52 engage top surface 55 of channels 51, to slidably support the block E. Block E is attached to members 52 by screws 56 with the flat top surface 57 of the block E in engagement with bottom surface 58 of channels 51 to allow transverse reciprocal sliding of the block but preventing other displacement.

The bottom of block E is grooved to form a plurality of parallel slots 59 separated by depending teeth 61. Each slot 59 houses a welding wheel supporting bus bar 62 pivotally mounted therein by a dielectric axle 63. Block E is also made of dielectric materials so that bus bars 62 are pivotally supported within the slots 59 electrically insulated from one another. The center of gravity of each bus bar with respect to axle 63 is located forward of the axle so that the welding wheels 47 are gravity urged downwardly so the wheels 47 are urged out of contact with the roller 48 when the wheels are out of engagement with the support assembly C, to facilitate shifting of the block without impedance between wheels 47 and roller 48.

Each welding wheel 47 is rotatably supported within the groove 65 of a bifurcated front end of each bus bar 62 by an axle 66 engaged with two arms 65$^a$ forming the bifurcated end. Arms 65$^a$ are urged inwardly to rub against wheels 47 to make a positive electrical connection therewith. The rear end 67 of each bus bar 62 projects outwardly beyond the block E to form a terminal connector 68 to which electrical wiring 69 makes electrical contact with each bar and welding wheel with a terminal plate 71 on the rear underside of the carriage main frame 25 to furnish an electrical power connector from a welding power source K.

Figure 21:
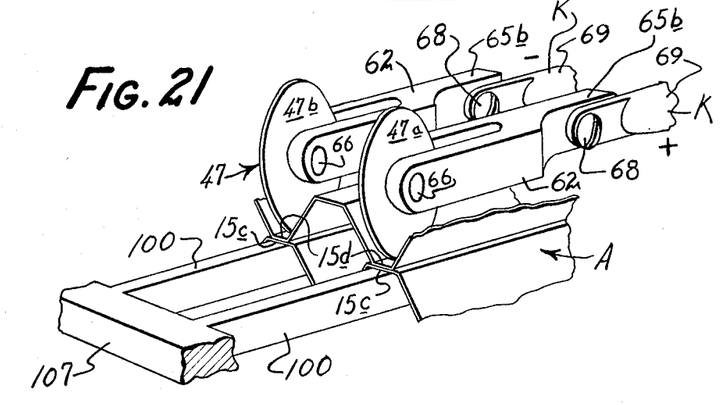
FIG. 21 is a fragmentary perspective view of a pair of welding wheels to illustrate the electrical path between the welding wheels of the pair through the webs.

In the preferred embodiment of the invention two welding wheels 47 are connected together in pairs as illustrated in FIG. 21. One wheel designated as 47$^a$ of the pair is provided with positive voltage from power supply K through wiring leads 69 and the other wheel designated as 47$^b$ is provided with a negative potential through wiring leads 69 from power supply K. The bus bars 62 serve as an electrical conductor to pass current from terminal 68 to the welding wheels 47 and as a structural support for the respective welding wheels 47. With this circuit electrode fingers 100 hereinafter more fully described are arranged electrically connected together by a cross member 107. By this arrangement when the welding wheels are brought into contact with nodes 15$^d$ there is created an electrical circuit between the two wheels 47 through the respective paris of nodes 15$^d$ and 15$^c$ and fingers 100.

Although the above described welding circuit has proven particularly satisfactory it is obvious that other circuits could also be employed. For example all terminals 68 could be connected together with the welding wheels 47 connected in parallel to the positive potential lead from power source K and the fingers 100 grounded to the negative lead of power source K.

Pneumatic means are provided to rotate the secondary carriage 41 to effect a raising and lowering of the welding wheels 47. Pneumatic means are also provided to move the secondary carriage transversely to one of two positions to provide transverse registration of the welding wheels with core welding nodes 15$^a$ and 15$^d$ on the assembly C and other pneumatic means are provided to move the welding electrode block E transversely with respect to the secondary frame 41 to one of two positions to effect a more minute transverse registration between welding wheels and the core. To effect these three increments of motion, the above pneumatic means includes three pneumatic motors 73, 74, and 75 each being of double acting reciprocating type in which a piston 76 is in a housing 77 which forms cylinder 77$^a$ wherein air flow in one side builds up pressure to force the piston to move in one direction and air flow in the other side will build up pressure to force the piston in the other direction with power take off being from a piston rod 78. The cylinders are of standard construction and not herein in specific detail described as their operation is well known in the art.

Although the preferred embodiment is described as having many pneumatically actuated components it is to be understood that hydraulic mechanisms and means may just as conveniently be used.

Housing 77 of motor 73 is mounted to a depending bifurcated bracket 81 on plate 40. Rod 78 of motor 73 is mounted by bracket 81$^a$ to rear plate 22 of the carriage main frame 25 so that when energized the secondary frame will rock in either a clockwise or counterclockwise direction about axle 42 to either raise or lower the welding wheels.

Motor 74 has its body 77 attached to a collar 82 located on axle 42 between secondary carriage walls 44 and 45. The drive rod 78 of motor 74 is attached directly with side wall 45 so that upon energization of motor 74 secondary frame 41 is transversely moved accordingly. Stops comprising adjustment screws 85 mounted on side plates 29 and 30 engage with side walls 44 and 45 respectively to adjustably limit the extent of transverse motion of the secondary carriage to effect registration with webs 14 on assembly C.

Pneumatic motor 75 has its body 77 mounted directly on side wall 44 of secondary carriage 41 and its drive rod 78 connected to T-shaped slide 52 so when energized block E is caused to move transversely with respect to the secondary carriage. Adjustable set screws 90 are mounted on side walls 44 and 45 to project inwardly toward outer end edges 91 of the T-shaped slide 52 to limit the distance of transverse motion of block E with respect to the secondary carriage and adjustable to align the welding wheels with ribbon 14 on assembly C.

Core A is welded while supported on assembly C by current flow from welding wheels 47 passing through abutting welding nodes of two top adjoining ribbons 14 as carriage D traverses the assembly.

Fingers 100 arranged in two sets 101 and 102 in assembly C, support the webs 14 during welding with the fingers of one set or the other also functioning as a base electrode to complete an electrical circuit through webs 14 from welding wheels 47. The fingers 100 of each set are staggered in parallel spaced apart alignment so that the fingers of each set are disposed to support flats 15$^c$ of one of two superposed webs 14. In FIGS. 1–4 it is noted that the nodes formed by flats 15$^c$ and 15$^b$ of each superposed row of cells are staggered so that the flat 15$^b$ of one web 14 is halfway between the flat 15$^d$ of the adjoining web 14. Fingers 100 of each set 101 or 102 are arranged in equally staggered relative alignment to longitudinally support flats 15$^c$ of one web.

Fingers 100 in cross section as viewed in FIG. 3 comprises a flat topped trunk 100$^a$ having a width slightly smaller than the width of flat 15$^c$. Body 100$^b$ of the fingers 100 is substantially larger than the trunk to provide rigidity for the fingers and the bottom is angularly tapered at 100$^c$ to provide clearance between the bottom of the fingers 100 and half cell 14$^b$. Thus the only point of engagement between the fingers 100 and the webs is the support contact between the flat top of trunk 100$^a$ and flat 15$^c$.

Assembly C in greater detail comprises two finger guide comb plates 104 with upwardly projecting teeth 105 which function as guide and spacer members for sets of fingers 101 and 102. A work area generally indicated at 106 to receive ribbons 14 for welding is defined between the two finger guide comb plates 104. The finger guide comb plates 104 are adjustably slidably mounted on way 24 in co-planar relation so the width of the work area may be increased or decreased to accommodate webs of different widths. The inner faces of the comb plates 104 act to align new ribbon with completed honeycomb as will be hereinafter more fully described. Fingers 100 of set of fingers 101 are rigidly connected to a cross member 107 at one end and are pivotally and vertically slidably mounted on a finger drive plate 109 at 108. Drive plate 109 is reciprocally mounted on way 24 to move longitudinally between front wall 21 and finger guide comb plates 104 so as to insert or withdraw sets of fingers 101 from work area 106. Similarly fingers 100 of set of fingers 102 are joined at one end by a connecting cross member 112 pivotally and vertically slidably mounted as at 111 on a finger drive plate 113. The plate 113 is reciprocally mounted on way 24 to move between finger guide comb plates 104 towards rear wall 22 so that upon movement of finger drive plate 113 a set of fingers 102 is also inserted or withdrawn from work area 106. Fingers 100 of the sets 101 and 102 are alternately staggered between teeth 105 and guided in co-planar equally spaced relation with each other in longitudinal alignment with ways 18 and 24 and spaced in conformity with the spaces between welding nodes of the webs 14.

Sets of fingers 101 and 102 are vertically supported by cam shafts 115 and 116. Cam shafts 115 and 116 are pivotally supported by brackets 117 projecting outwardly from the outboard side of finger guide comb plates 104. Each cam shaft 115 and 116 has a set of identical cam faces 119 in supporting alignment with fingers 101 and a second set of identical cam faces 120 is in supporting alignment with finger 102. Cam faces 119 and 120 are of substantially identical eccentric contour approximately 180° displaced. The cam shafts 115 and 116 are driven by a pinion 121 which is driven by a rack 122. The two sets of cams 115 and 116 are each in alignment with corresponding cam faces of each cam set arranged in phase. Rack 122 is slidably mounted on bearings 123 provided in plates 104 in alignment with pinion 121 to rotate sets of cams 115 and 116 equally when reciprocally moved.

The finger drive plates 109 and 113 are reciprocally driven by pneumatic motors 134 and 135 respectively of the same type as described above in connection with pneumatic motors 73, 74 and 75 and bearing the same reference numerals for their component parts. Motors 134 and 135 have their bodies or housings 77 mounted on front wall 21 and back wall 22 respectively and their drive shafts 78 mounted on finger drive plate 109 and 113 respectively so that upon actuation of either motor, its respective driving plates is accordingly driven.

The rack 122 is controlled by a rack drive mechanism 140 mounted under way 24 to a rod 141 suspended between front and rear walls 21 and 22. The rack drive mechanism is provided with pneumatic means to reciprocally drive the rack to one of two minor positions within the two major positions.

In greater detail, its rack control mechanism includes a collar 142 slidably mounted on rod 141. The collar 142 is limited in reciprocating movement by stops 143 and 144 on either side thereof adjustably controlled by set screws 145. A pneumatic motor 146 also of the same general type as motors 73, 74 and 75 is mounted with its housing 77 connected to stop 144 and its drive shaft 78 connected by a bracket 149 to the sleeve or collar 142. Motion is transmitted from the collar 142 to rack 122 by an upwardly projecting bracket 151 rigidly mounted on collar 142 which engages a downwardly depending arm 152 of the rack. A pneumatic motor 153 also similar in construction to motors 73, 74 and 75 is mounted with its body or housing 77 connected rigidly on sleeve 142 and its drive rod 78 connected to arm 152 to move the rack 122 between two stops 156, provided on bracket 151, to cause the secondary adjustment of the rack. Stops 156 each comprise a set screw 157 adjustable to determine stop limits.

Interposed between the two finger comb guide plates 104 are two web edge aligning combs 161 slidably urged towards their mounting plate 104 by a mounting screw and spring combination 162 provided in engagement with their respective plates 104. A pneumatic flexible cylinder 163 is provided between each edge aligning comb 161 and plates 104 which is arranged to inflate to force the two edge aligning combs away from the respective plates 104 to align the edges of ribbons 14 which may be in the work area 106 between the two combs 161.

Figure 10:
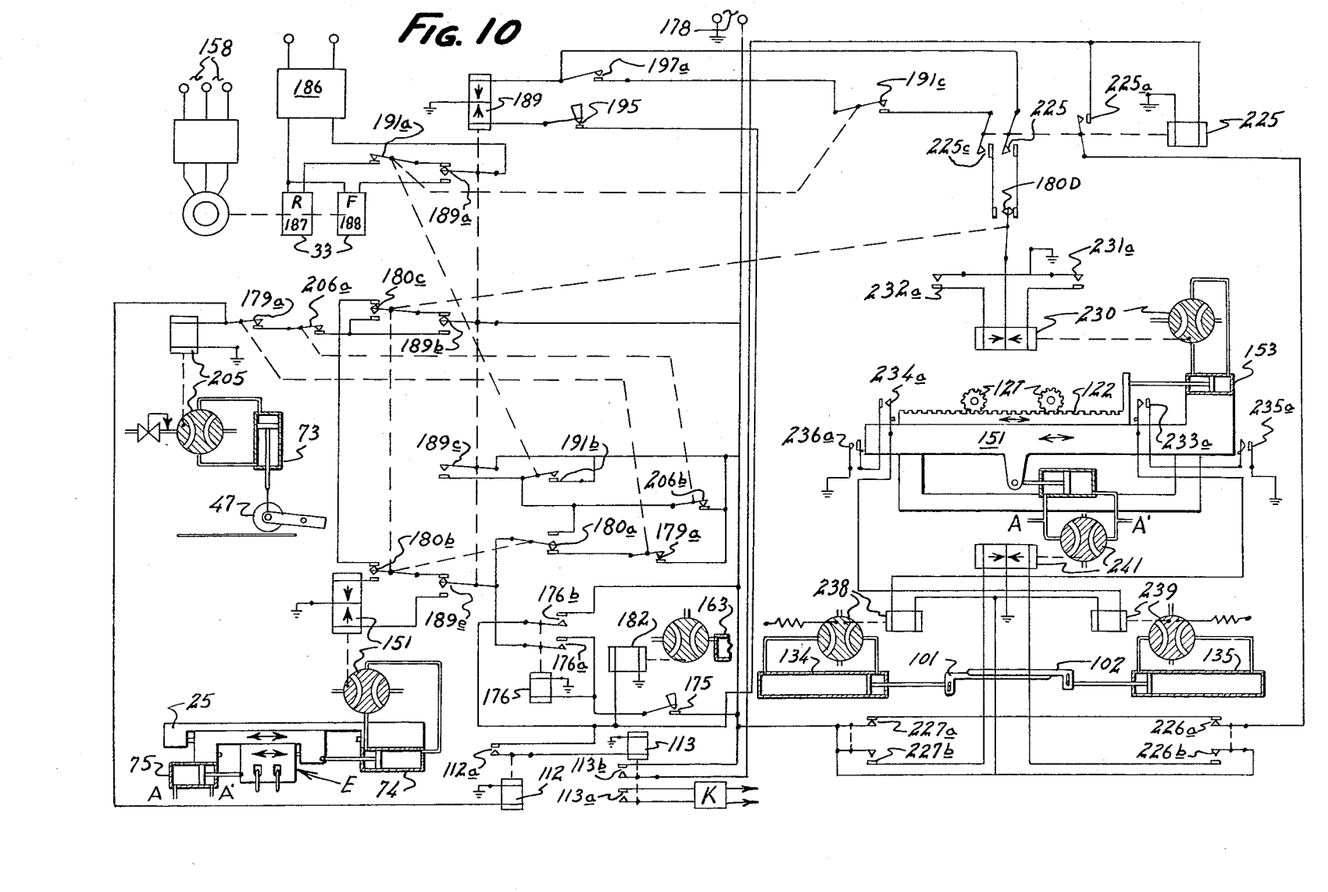
FIG. 10 is a schematic view of an electrical and pneumatic circuits which control the sequence of operations of the welding apparatus.

The operation of the device and electrical and sequencing circuit to effect programming, control and actuation of the various components will now be described by reference to the timing charts of FIGS. 12, 13 and 14 and schematics of FIGS. 9 and 10. Reference numerals on the timing charts (see FIGS. 12–14) are, where appropriate, in accordance with the switch and contact points reference numerals. In general a rise above a reference line in the timing chart indicates an "on" or "closed" condition of a switch contact point unless otherwise designated.

Figures 11A, 11B:
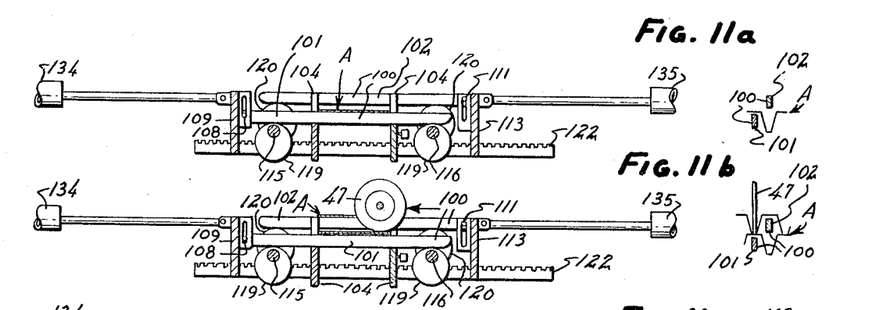
FIGS. 11A through H show sequence of movement during various welding phases and relative movement of cell or core supporting fingers in schematic form.

In the beginning of a welding operation carriage D is at rest in its home position adjacent rear wall 22 and sets of fingers 101 and 102 are nested within work area 106 in position to support two superposed ribbons 14. Fingers 101, supported by combs 164, are held substantially below fingers 102, supported by cam faces 120. A first ribbon web 14 is manually placed on fingers 100 of fingers 101 as diagrammatically illustrated in FIG. 11a. A second ribbon is then inserted on fingers 100 of set of fingers 102 so the lower portion of welding node 15$^d$ abuts in alignment with welding node 15$^c$ of the lower ribbon. The edge aligning combs during this phase of operation are forced apart by springs 162 to sufficiently widen the work area to allow convenient placement of the ribbons therein. The top of each tooth 164 of the aligning comb is flanged inwardly as at 165 so that the inwardly flanged portion of the tooth holds the ribbon supported by fingers 102 in place.

After the ribbons 14 are in place as above described a manual switch 175 is momentarily depressed which is connected to energize a relay 176 by momentarily completing a circuit with a source of alternating current supply such as a conventional 115 volt supply 178 to the relay. Upon energization of relay 176 normally open contact points 176$^a$ of the relay are closed which latches the relay in energized condition through a microswitch contact point 179$^a$ of a microswitch 179, and a contact point 180$^a$ of a manually operated change of sequence switch 180. The function and location of switches 180 and 179 will herein after be described in connection with further sequences. Thus upon closing switch 175 relay 176 is held in latched closed condition. A second normally open relay contact point 176ᵇ of relay 176 is closed upon energization of relay 176 which activates a solenoid control valve 182 which supplies pneumatic pressure to inflate the edge aligning comb cylinders 163, the action of which is indicated by line 184 of FIG. 12. In this condition it can be seen that the edge aligning combs 161 are forced together to align the edges of ribbons 14.

The welder carriage D is then armed to start movement along way 18 to effect welding. Motor 32 is supplied with electrical power potential such as by a 220 volt supply 185 so that the motor is in continual operation. Drive from the motor to the motor driven chain drive mechanism 31 is through the forward reverse clutch 33. Control voltage to actuate clutch 33 is from a rectified power source 186. The circuit to control the reverse clutch control 187 and the forward clutch control 188 of clutch 33 is selected by a forward reverse control relay 189 the operation of which is indicated by line 189 of FIG. 13, reverse position being indicated below the reference line and forward position being indicated above the reference line. Forward control 188 is actuated directly through relay transfer points 189a of relay 189 when the relay is in the forward position. The reverse control 187 is actuated through relay transfer points 189ᵃ when the relay 189 is in the reverse condition and through a limit switch contact points 191ᵃ of a normally closed reverse movement limit switch 191. The limit switch 191 is mounted on side panel 29 of carriage D with a switch actuating to arm 192 to actuate the switch to open contacts 191ᵃ by engagement with back wall 22 when the carriage is at its home position. The forward-reverse relay 189 is actuated to move to the forward position by a manually actuated start switch 195 through contact points 176ᵇ. It is noted that the edge alignment must first be started before the start circuit for the movement of the carriage is armed. When switch 198 is momentarily closed relay 189 is forced to its forward position. Once relay 189 is moved to forward condition it there remains until pulsed to move to the reverse condition. Forward limit switch 197 is mounted on side panel 29 of carriage D adjacent front plate 26 with an arm 198 which closes normaly open contact points 197ᵃ of the switch when engaged with a collar 199 mounted on a rod of way 18. The collar is positioned to engage the arm 198 when the carriage D has traversed to a desired limit and contact points 197ᵃ close the circuit with voltage supply 178 to move the relay 189 to its reverse condition. Thus carriage movement indicated by line 200 of FIGS. 12 and 13 starts in the forward direction upon momentarily closing switch 195 after the edge aligning switch 175 has been depressed and relay 176 actuated. This causes the carriage D to be driven in a forward direction toward wall 21 as indicated by ascending line 200.

Normally the welding wheels are held in position substantially above the work area by the actions of pneumatic motor 73 and the welding current to the welding electrodes 47 is in the off position. Subcarriage 41 rotary movement in carriage frame 25 is indicated by line 201 of FIG. 12 with a raise indicating the carriage with the wheels 47 in welding position. The welding current is indicated by a line 202 of FIG. 12. A spring return solenoid actuated valve 205 controls pneumatic cylinder 73 to cause the secondary frame 41 to rotate the welding electrodes 47 into position in engagement with the work area when energized from current supply 178 through a circuit indicated by a line 190 of FIG. 13 consisting of a normally closed microswitch contact point 179ᵇ, a normally closed microswitch contact point 206ᵃ and a relay transfer point 189ᵇ of relay 189 closed when relay 189 is in the forward condition. Microswitch 206 carrying contact points 206ᵃ and the switch 179 carrying points 179ᵇ and 179ᵃ depends from terminal plate 71 adjacent side 29 of carriage D. Switch actuating arms 208 and 209 of the two switches 206 and 179 respectively are arranged to engage with a cam plate 210 mounted on way 24 to actuate switch 206 to open contact points 206ᵃ from the carriage's home position forward to a position where with the welding wheels 47 of the carriage are about to enter work area 106 and a cam 211 to actuate arm 208 to open contact points 179ᵃ and 179ᵇ of switch 179 when the welding wheels have passed the work area. The welding wheels are therefore forced down against the fingers 102 and the ribbons 14 thereon when the wheels are vertically aligned with fingers 101 or 102.

A welding current supply K is connected to energize the welding wheels 47 and fingers 100 upon the closing of relay contacts 113ᵃ of a relay 113. The relay 113 is energized through contacts 176ᵇ in series with relay contact points 112ᵃ of a relay 112. Points 112ᵃ are closed upon energization of relay 112 from the circuit generally indicated by reference line 190. Welding current is then dependent upon both relays 176 and 112 being energized. This condition is met only while the welding wheels are engaged within the work area 106.

During the forward stroke of the carriage D, after the wheels pass the work area, switch 179 is cammed open thus closing the circuit indicated by line 190 and turning off the welding wheel welding current and then releasing the welding wheel pressure to raise the wheels. When the carriage has reached its maximum forward travel limit, switch arm 198 engages with collar 199 and switch 197 is closed. Relay 189 is thus caused to shift to the reverse direction. This actuates the reverse clutch control 187 and carriage D returns in reverse to its home position. Welding wheels 47 remain up and the welding current remains off while carriage D travels in reverse. Finally when switch 191 has its arm 192 actuated by wall 22, current through contact points 191ᵃ to the reverse clutch is broken thus rendering the reverse clutch de-energized.

It is necessary after the completion of the welds to remove or withdraw the lower bank of fingers 101 or 102 from the work area, then lower the upper fingers by rotation of cam shafts 115 and 116, and thereafter place the withdrawn fingers in position on top of the top web 14 so that a new web may be placed on top of the top fingers 101 or 102 for welding as seen in FIGS. 11A–H. In addition, it is desirable to raise the upper fingers prior to withdrawing the lower fingers in order that the lower fingers be freed from any welds between webs and fingers and the frictional engagement be lessened between fingers and the core A. This action is useful when excessive welding heat from welding electrodes 47 causes a web 14 to weld to its supporting finger. The raising of the upper fingers will tend to strip any such weld.

To obtain the proper sequence normally closed relay contact points 213ᵇ of relay 213 are arranged when closed to energize a relay 225. Thereafter relay 225 is latched closed through contact points 225ᵃ of relay 225 in series with two pair of microswitch contact points 226ᵃ and 227ᵃ of microswitches 226 and 227 located to be activated upon the sets of fingers 102 and 101 respectively being completely withdrawn. Contacts 225ᵇ of relay 225 close when the relay is energized and finger transfer will then start when contacts 197ᵃ are closed.

In the sequence of operation hereinbefore described relay 225 will be energized when carriage D has traversed to the end of its forward stroke. After points 225ᵇ are closed when the carriage returns to its starting position contacts 197ᵃ are closed which energizes a double acting solenoid actuated valve 230 which controls pneumatic motor 153 to effectuate the small or minute movement of rack 122 to lower the lower fingers and raise the upper fingers. The direction of movement by the solenoid actuated value and consequently the direction of movement of the rack 122 is determined by two microswitch contact points 231ᵃ and 232ᵃ of microswitches 231 and 232. The switches 231 and 232 are located on comb guide plate panels 104 and are arranged to engage with one of the fingers 101 and 102 respectively so that the contact points 231ᵃ or 232ᵃ will be closed by finger 101 or 102 respectively only when in the lower welding position. When fingers 101 are in the lower position microswitch contact points 232ᵃ will be closed, therein causing the pneumatic motor 153 to move to the right and when fingers 102 are in the lower position points 231ᵃ will close to cause motor 153 to move the rack 122 to the left. The cam faces 119 and 120 are normally displaced from maximum displacement so that upon movement of the rack 122, as indicated by motor 153, the cam faces are moved to a position where there is a maximum displacement between the two faces 119 and 120 to cause the upper fingers to separate a greater distance from the lower fingers.

Two microswitches 233 and 234 are mounted on bracket 151 so that arm 152 closes switch contact points 233ᵃ of switch 233 when the arm is moved to the far left position and close contact points 234ᵃ of switch 234 when the arm is in the full right position. Switch contact points 233ᵃ are in series with contact points 235ᵃ of switch 235 to control a spring returned solenoid actuated valve 238 which causes motor 134 to withdraw sets of fingers 101 from the work area when actuated by the closing of both contact points 235ᵃ and 233ᵃ. Another spring returned solenoid actuated valve 239 is provided to control motor 135 which causes fingers 102 to be withdrawn from the work area when actuated. Points 234ᵃ are in series with contact points 236ᵃ of a microswitch 236 so the spring returned solenoid actuated valve 239 is actuated upon closing of both switches 234ᵃ and 236ᵃ.

The switches 235 and 236 are mounted on stops 144 and 143 respectively so that when sleeve or collar 142 moves to the far right, contacts 235ᵃ are closed and when the collar moves to the far left, contacts 236ᵃ are closed. When motor 153 drives rack arm 152 to the right, switch contact points 233ᵃ are closed while the collar 142 is in the far left position which completes the circuit to solenoid actuated valve 238, thus causing motor 134 to be actuated to withdraw fingers 101 from the work. When motor 153 drives rack arm 152 to the left, switch contact points 234ᵃ are closed while the collar 142 is in the far right position which completes the circuit to solenoid actuated valve 239, thus causing motor 235 to be actuated to withdraw fingers 102 from the work. When the fingers are withdrawn, normally open microswitch contact points 227ᵇ of the switch 227 or normally open microswitch contact points 226ᵇ of microswitch 226 are force closed. The switch 227, as hereinbefore described, is mounted to be energized to open switch contact points 227ᵃ and close normally open switch contact points 227ᵇ by engagement with finger plate 109 upon complete withdrawal from the work area of fingers 101, and switch 226 is mounted to be energized to open switch contact points 226ᵃ and close normally open switch contact points 226ᵇ by engagement with finger plate 113 upon complete withdrawal from the work or fingers 102. Switch contact points 227ᵇ and 226ᵇ actuate a double acting solenoid control valve 241 which operates motor 146 to cause rack 122 to move in the major increment causing cam faces 119 and 120 to shift relatively raising and lowering sets of fingers 101 and fingers 102. When the rack is shifted, contact points 235ᵃ or 236ᵃ then open breaking the circuit to valve 241 and cause the withdrawn sets of fingers 101 or 102 to be forced inwardly toward the work area. At the time of actuation of switch 226 or 227 upon complete withdrawal of the sets of fingers 101 or 102, contact points 226ᵃ or 227ᵃ open to break the circuit latching relay 225 closed. At the same time, contact points 226ᵃ or 227ᵃ are arranged to close to cause reversal of solenoid actuated valve 239 wherein the fingers are then forced to return toward the work area 106.

It is to be noted that the shifting of sets of fingers 101 and 102 shifts the welding track position and the node to be welded one-half the distance between nodes. To accommodate for the shift it is necessary to transversely reregister the welding wheels 47 with the nodes to be welded. The re-registration is accomplished by solenoid actuated valve 241 which is arranged to actuate pneumatic motor 75 which shifts block E to one side or the other to align the welding wheels 47 with the lower sets of fingers 101 or 102. Thus the welding wheels also shift to align in lateral registration with the lower fingers 101 or 102 with the lowering of the fingers 101 or 102.

In the time chart indicated in FIGS. 12 and 14 the position of sets of fingers 102 with respect to the work area is indicated at line 230 designated with sets of fingers 102 in the work area below the reference line and withdrawn from the work area above the reference line. The position of sets of fingers 101 is similarly indicated at line 231. The vertical position of the sets of fingers 102 in indicated by line 232 indicated above the reference line to indicate a raised position of the fingers and below the reference line to indicate a lower position of the fingers and similarly the relative vertical position of sets of fingers 101 is indicated at line 233. The relative positions of the welding wheels of block E are indicated at line 234 wherein the line above the reference line indicates the position of the welding wheels in alignment with sets of fingers 101 and below the reference line in alignment with sets of fingers 102. Thus assuming that fingers 102 are in the upward position and sets of fingers 101 are in the lower position at the start of a finger transfer (see FIGS. 11a—11b) upon the receipt of a start signal such as indicated at line 240 relay 225 is energized. The finger exchange switch 232ᵃ is closed because fingers 101 are at the lower position which causes fingers 102 to rise so sets of fingers 101 are relatively lower upon movement of the rack 122 within the minute increment between stops 156. Upon completion of said movement, switch contact points 233ᵃ close which completes a circuit through the contacts 235ᵃ to start withdrawal of fingers 101 from the work area (see FIG. 11c). Then upon complete withdrawal of sets of fingers 101, switch contact point 227ᵃ opens to deenergize relay 225 and switch contact 227ᵇ is opened which causes the rack 122 to shift position so that sets of fingers 102 lower and sets of fingers 101 rise (see FIG. 11d). At the completion of the shift, switch contact points 235ᵃ open to cause sets of fingers 101 to again be inserted in the work area (see FIG. 11e). At the same time, the block E of welding wheels 47 shifts lateral position as indicated at line 234. Thus a complete finger transfer has been effected so that a new web 14 may be inserted in the work area and the process repeated (see FIGS. 11f and 11h).

Figure 12:
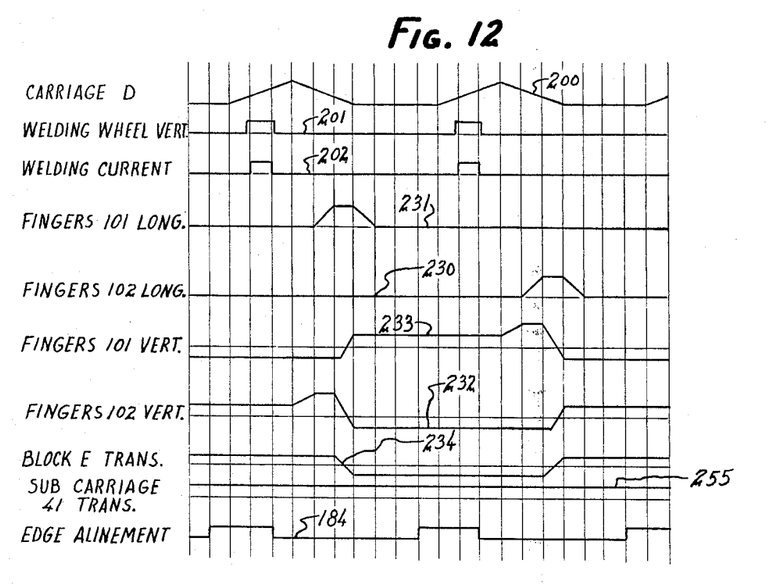
FIG. 12 is a timing chart indicating the relative movement times of mechanical elements of the welding apparatus.
Figure 15:
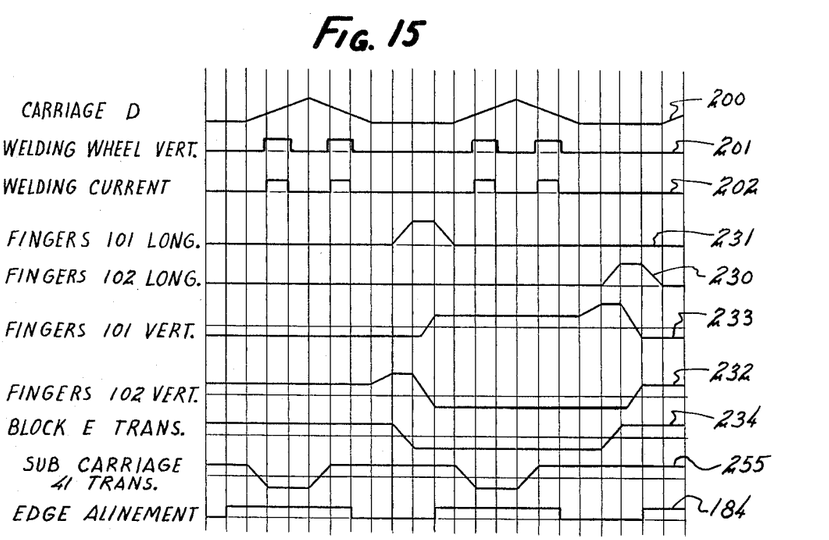
FIG. 15 is a timing chart showing relative movement times of elements identical with the chart of FIG. 12 when operating in a modified sequence of operation.

In the sequence of movement as shown by the time chart of FIG. 12, it can be seen that welding occurs on the forward stroke and the finger transfer action starts with a start pulse issued at the moment of return of the welding carriage D by the closing of contact point 197ᵃ. A switch 180 indicated as having transfer points 180ᵃ⁻ᵈ is provided in the programming and control circuit of FIG. 10 to change the sequencing of FIG. 12 as shown in FIG. 15. FIGS. 15 and 12 bear identical reference numeral designations. In the sequencing shown by FIG. 15, wheels 47 are spaced a distance greater than the distance between adjacent nodes with the wheels being an integral multiple of the spacing between the welding nodes. By this spacing the welding wheels are aligned with nodes at least two nodes apart as viewed in FIG. 16. It can be readily appreciated that in the welding of smaller cell sized honeycomb core, that it is advantageous to maintain the welding wheels at least two nodes apart so the electrodes, insulators, and electrical connectors of block E need not be miniaturized below practical limitations.

Figures 8, 9, 16:
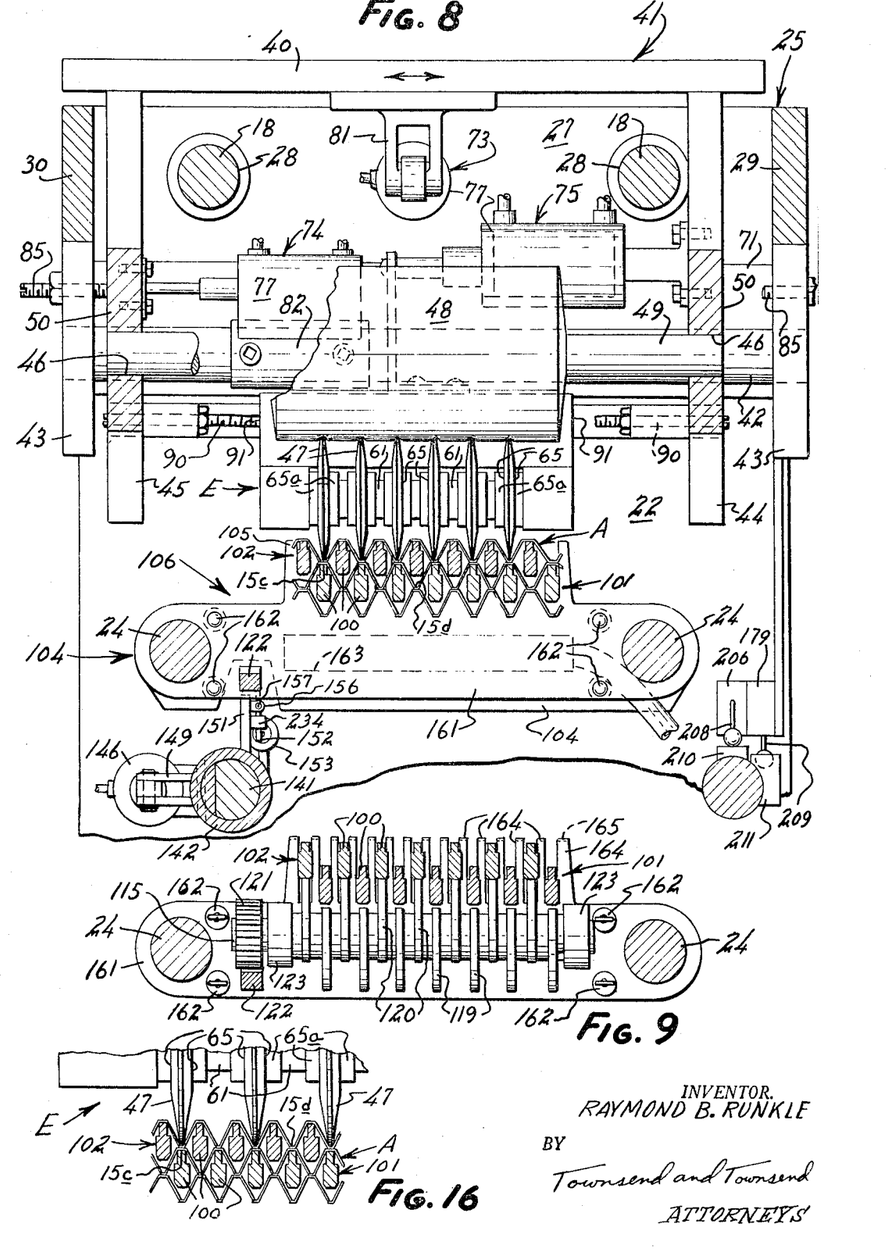

Referring to the finger positions as indicated in FIGS. 11a through h and shown in cross-section in FIGS. 8, 9 and 16 it is noted that the lower set of fingers is arranged to act as the primary support for the honeycomb except during the phase of operation indicated at FIGS.

Figure 11C:
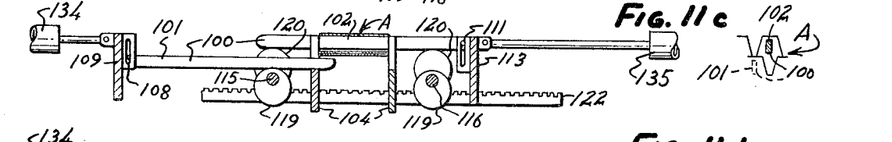
Figure 11D:
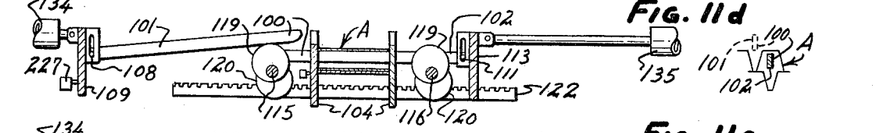
Figures 11E, 11F:
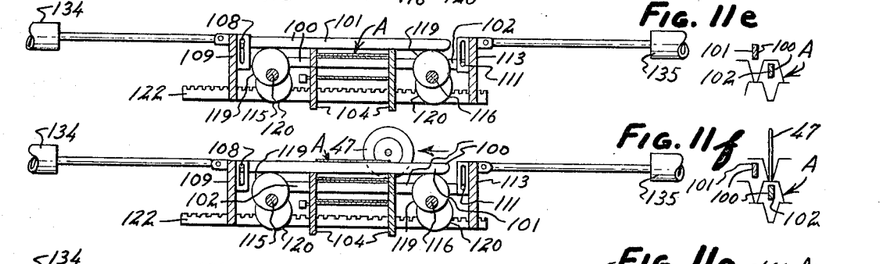
Figures 11G, 11H:
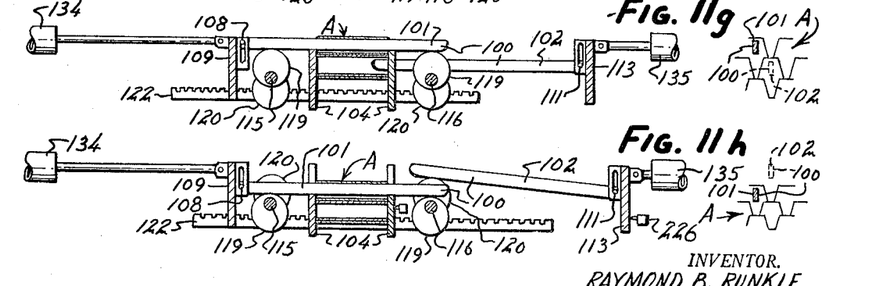

11c and 11g during which time the upper fingers solely support the welding honeycomb so that the lower fingers may be removed. It is to be noted that in all phases of operation other than during the time that the lower fingers are withdrawn that the upper set of fingers are in position to support the upper web. However it is not necessary during these phases of operation that the upper set of fingers actually function to support the upper web. The upper set of fingers may be entirely out of web contact or may be positioned solely to align the upper web so that the respective nodes are in alignment with the adjacent lower web without adding support for the web or as a third alternative the upper fingers may provide some support for the upper web, in addition to providing an alignment mandrel therefor. It is to be noted that in the language of the claims that the term in position to support a web or supporting position is intended to mean that the fingers are disposed under node $15^c$ of the upper web but does not necessarily mean that there is any supporting engagement between the fingers 100 and web.

Figure 6:
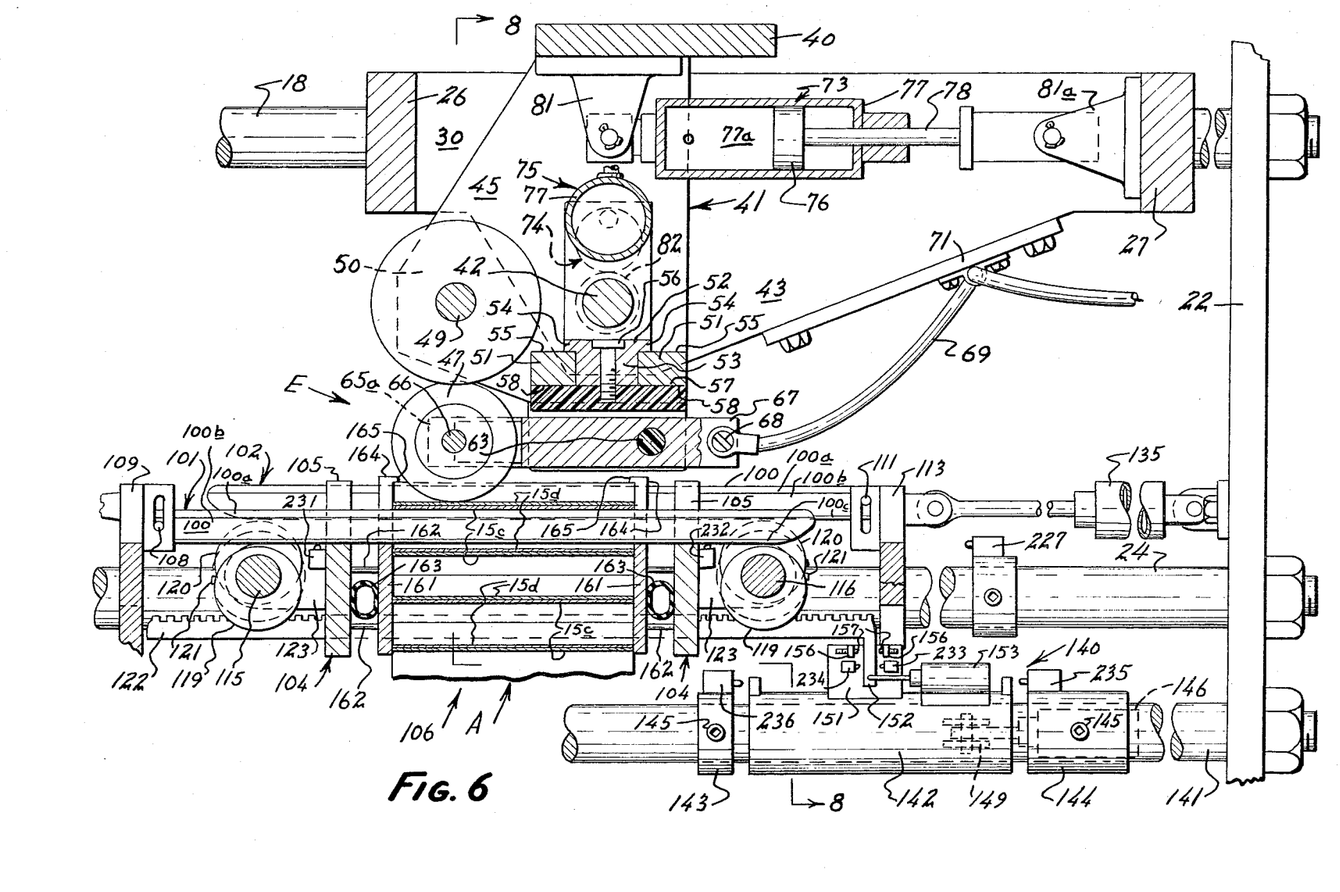
FIG. 6 is a fragmentary section of the welding apparatus.
Figure 7A:
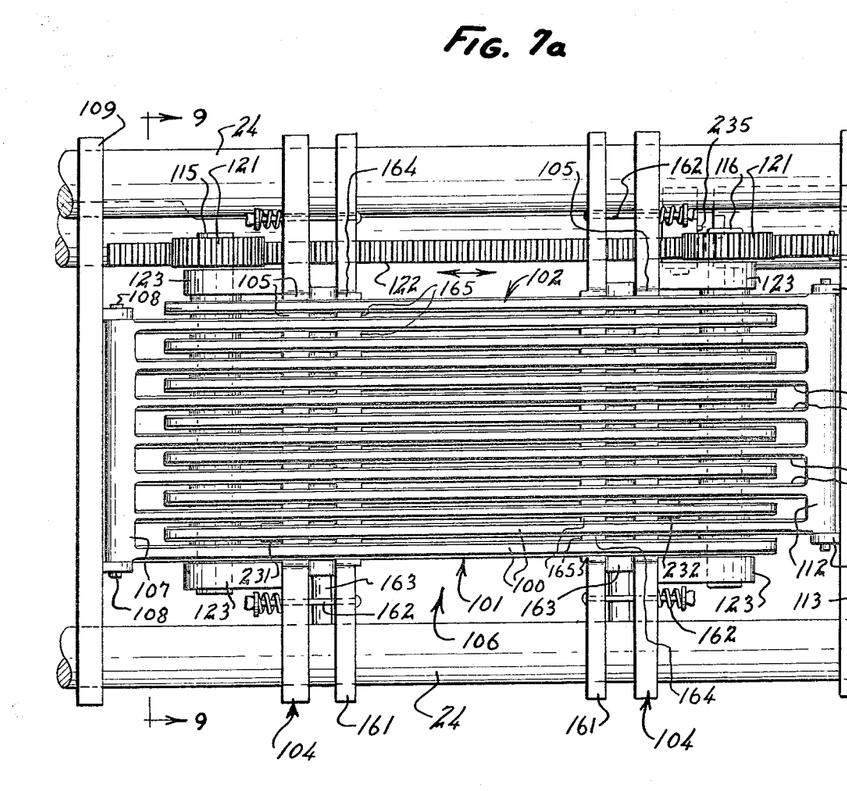
FIG. 7a is a plan view looking from the top of the welding work area of the welding apparatus.
Figure 7B:
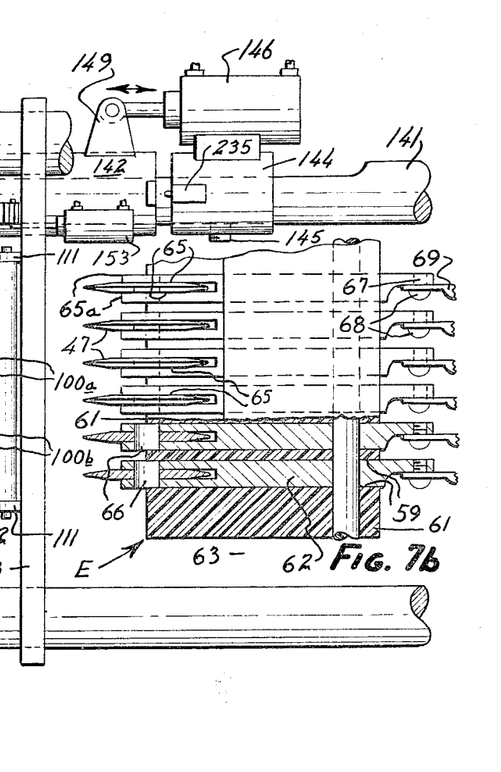

Referring specifically to FIGS. 6 and 8 it is noted that each welding wheel 47 is rotatably mounted on the end of a bus bar 62 and the bus bar is in turn pivotally supported by axle 63 so that the welding wheels are in effect floating or unrestrained against vertical movement except upon contact with the support assembly C or with the roller 48. When the carriage is in the welding position the roller 48 is arranged against the rim of the welding wheels to function as a resilient load to force the wheel against the fingers 100. This system provides for a substantially low mass loading of the wheels against the work so that should there be irregularities in the surfaces of the webs or electrode fingers 100 the wheels are able to be vertically displaced to follow such irregular contour. Because of the resilient uniform loading of the roller there is approximately uniform welding pressure exerted by all welding wheels. It is also to be noted that the roller 48 can be provided with circumferential grooves in alignment with the wheels to provide tracks in which to guide the rotation of the wheels and thereby prevent transverse displacement of the wheels on their rotational axis. It is also noted that the resilient rubber roller 48 may be impregnated with an abrasive such as sand or emery particles so that the roller surface in addition to providing a bias function with respect to the wheels also functions to dress the rims of the wheels during relative rotation between wheels and rollers by the abrasive action of the roller against the wheel rim.

Because of the relative low mass of the system and the substantially independent loading or urging action on the wheels by the roller the wheels are quickly able to move downwardly to maintain pressure during the instant of welding when a forging action and reduction of total thickness of two webs normally takes place.

In the modified sequence of FIG. 15 the carriage D is arranged to weld one-half the nodes on the forward stroke. Then prior to the carriage D returning in the rearward stroke the subcarriage 41 shifts to align with the unwelded nodes. During the rearward stroke the welding wheels will be forced down and welding current turned on so that the unwelded nodes are welded on the reverse stroke. The withdrawal and replacement of the fingers 101 and 102 is deferred until the carriage returns to its home position adjacent rear wall 22.

To effect the sequence transfer points $180^a$ transfers the latch circuit for relay 176 to a circuit designated by a dotted line 249 of FIG. 12 including a normally closed switch contact point $206^b$ of microswitch 206 and a normally open microswitch contact point $191^b$ of microswitch 191 in parallel with a relay contact point $189^c$ of relay 189, closed only when relay 189 is in the forward condition. This change causes a change of timing of contacts $176^b$ as indicated by dotted line 250 interposed on line $176^b$ of FIG. 13 so relay 176 will be unlatched on the return stroke after passing the work area. Transfer point $180^b$ operates a double acting solenoid actuated valve 251 in a circuit controlled by relay 189. The valve 251 operates pneumatic motor 74 to effect a shift of subcarriage 41 within main carriage 25. The shift is controlled by relay contact points $189^b$ of relay 189 so that the subcarriage is shifted in one direction during the forward stroke and to the opposite direction on the rearward stroke.

Figure 13:
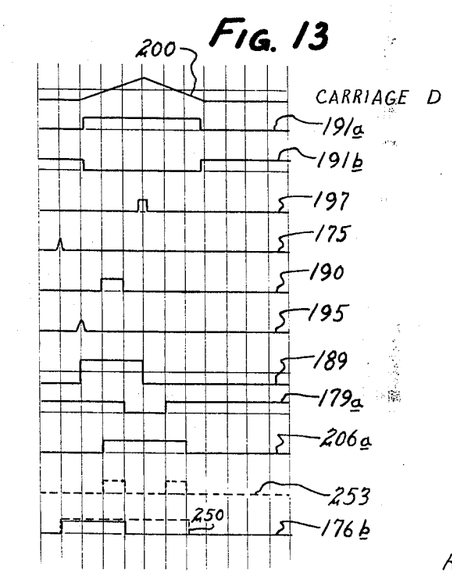
FIG. 13 is a timing chart indicating the relative movement times of the identified switch contact and transfer points to effect the movement indicated in FIG. 12.

Contact points $180^c$ shorts relay transfer points $189^b$ so that the circuit illustrated by line 190 is modified as indicated by dotted line 253 of FIG. 13 so the welding current is turned on and motor 73 energized to force the welding wheels against the fingers 100 on both the forward and reversed stroke of carriage D. Transfer points $180^d$ shifts the control circuit for the finger transfer from contact $225^b$ to contacts $225^c$ and normally open microswitch contact points $191^c$. This causes a delayed start pulse so the finger transfer is deferred until switch 191 is actuated by the return of the carriage to home position.

Figure 14:
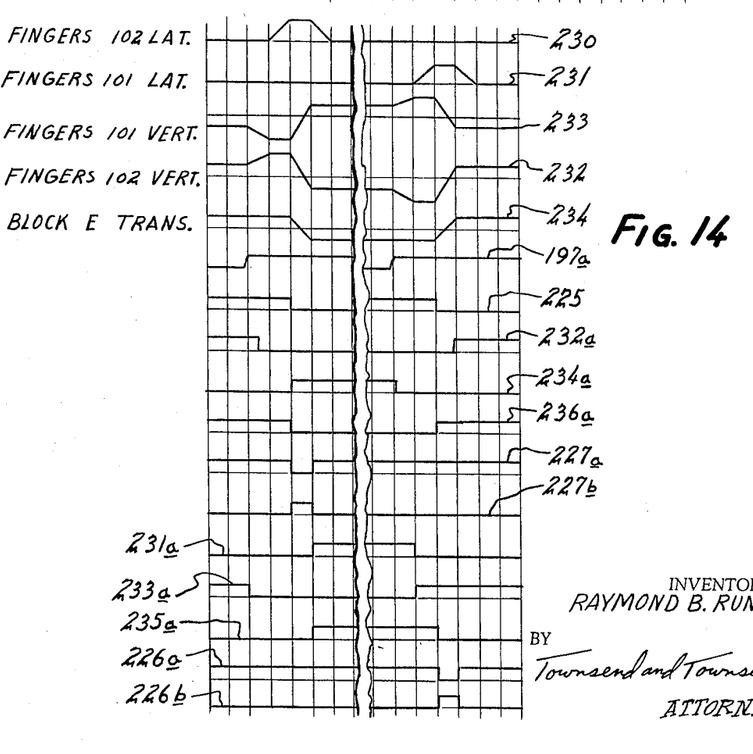
FIG. 14 is a timing chart showing in detail the relative movement times of the work supporting fingers and the action of the identified contact points and transfer points to effect the finger transfer.

Referring to FIGS. 10, 13, 14 and 15 it can be seen that at the start of welding operation the edge aligning switch 175 is depressed as hereinbefore described, thus energizing and latching closed relay 176. Then upon depression of switch 195 the carriage moves in the forward direction. The lateral position of the subcarriage 41 with respect to the carriage is indicated at line 255 of FIGS. 12 and 14 with indications above the line indicating the carriage at the far right position and below the reverse line in the far left position. Upon start of the carriage in the forward direction with the shift of relay 189 carriage 41 shifts from left to right. Then as the carriage reaches a predetermined forward position the welding wheels 47 are then forced downwardly as indicated by line 201 and the welding current is turned on as indicated at line 202. Upon reaching the end of the welding area the welding wheels rise and the welding current is turned off. After the carriage reaches its ultimate forward limit, switch 197 is actuated which causes a shift of relay 189 and thence both a reversal of carriage movement and causes a shift of the subcarriage 41 within carriage 25 to the left position. As the carriage returns to the welding area the welding wheels are again forced down to welding position and the welding current is turned on. Upon passing the welding area the welding current is turned off and the wheels rise. Then after the carriage reaches home position switch 191 is actuated to top reverse travel of the carriage and starts the finger transfer sequence as shown in FIG. 14.

Referring again to FIGS. 1, 2, 3, and 4 it is noted that core A of four different cell sizes to wit: $\frac{3}{8}''$, $\frac{1}{4}''$, $\frac{3}{16}''$, and $\frac{1}{8}''$ are illustrated. It can be readily observed that the nodes $15^d$ are the same size for each cell. The remaining dimensions are of course different for each cell configuration. Nodes $15^d$ being of one standard size allows welding electrode wheel 47 of one standard shift size to be used for welding cores within a variety of sizes. Thus with the standard size wheels standard uniform welding contacts are made to form substantially identical welds for all cell sizes.

It is also noted that the nodes $15^c$ are in each cell size slightly larger in width than the node $15^d$. This allows the node $15^d$ some latitude in node to node registration of the superposed webs while still insuring that the entire flat of node $15^d$ is in contact with the flat of node $15^c$.

Figure 2:
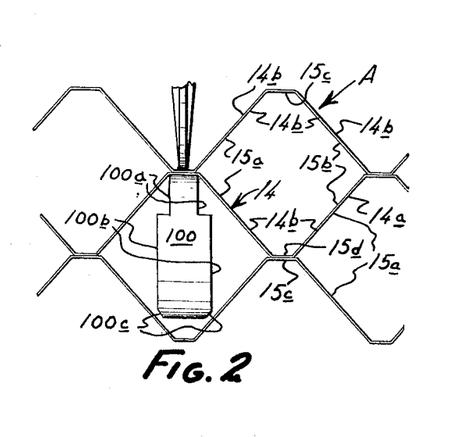
FIG. 2 is a schematic fragmentary honeycomb core of a one-quarter inch cell with an end view of welding electrodes shown in their relative positions with respect to the cell during welding.
Figure 3:
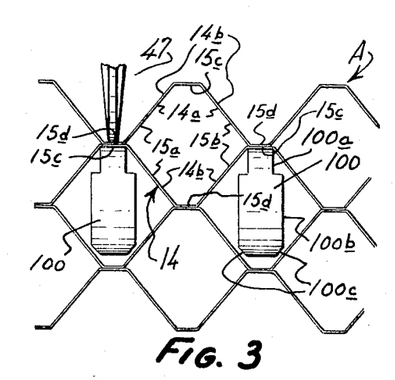
FIG. 3 is a schematic fragmentary honeycomb core of a three-sixteenth inch cell with an end view of welding electrodes shown as in FIG. 2.
Figure 4:
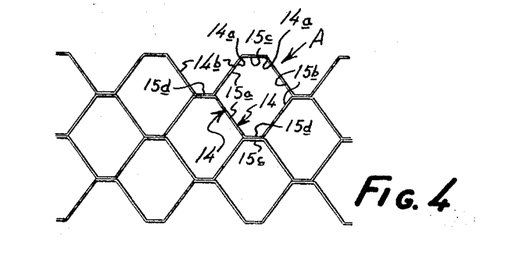
FIG. 4 is a schematic fragmentary honeycomb core of a one-eighth inch cell.

The $\frac{3}{8}''$ and the $\frac{3}{16}''$ cell as shown in FIGS. 1 and 2 or the $\frac{1}{4}''$ and $\frac{1}{8}''$ size cells shown in FIGS. 3 and 4 can be welded by a block E of welding wheels 47 spaced the distance of welding nodes of the larger of the two cell sizes apart. To weld the larger cell sizes such as $\frac{3}{8}''$ and $\frac{1}{4}''$ sizes the procedure and sequencing as indicated in FIG. 12 is employed. To fabricate the smaller cell size the support assembly C is modified by changing the sets of fingers 101 and 102, plates 161 and 105 to conform with the smaller cell size. Welding is then performed using the sequence illustrated by the timing chart of FIG.

15. The welding wheels are thus arranged to engage every other welding node on one pass of the work then on the return stroke weld the unwelded nodes.

It can thus be seen that the device has considerable flexibility in fabricating various cell sizes. It can be seen that the block E may be removed by removing screw 52 so that it may be replaced with a new block having welding wheels spaced to conform with any cell size desired. Sets of welding fingers 101 and 102, guide plates 104 and the edge aligning plates 146 can be removed from way 24 and replaced with finger and plates in size relationships corresponding to the selected cell size. It is furthermore noted that in the use of the two sequences of operation that a single block E of welding wheels 47 may be used to weld at least two different sized cells. In each case however the operation of the machine except as differentiated by the sequence shown in FIG. 12 and FIG. 15 can remain identical regardless of cell sizes. It is, of course, obvious that further modifications of the device could be made such as, for example, the carriage 41 could be arranged to move to more than two selected positions so the wheels 47 would engage only a partial group of nodes on each pass but would make a number of passes so that each node would be welded. In this way cell sizes of even still smaller dimension may be fabricated with a predetermined size block E.

Figure 17:
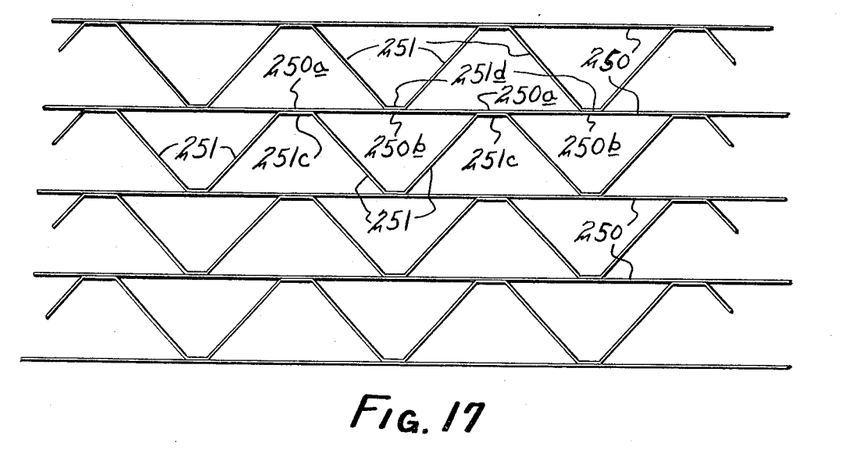
FIG. 17 is a schematic of fragmentary honeycomb core of a specific alternate cell configuration which may be welded by the welding apparatus of the invention.
Figure 18:
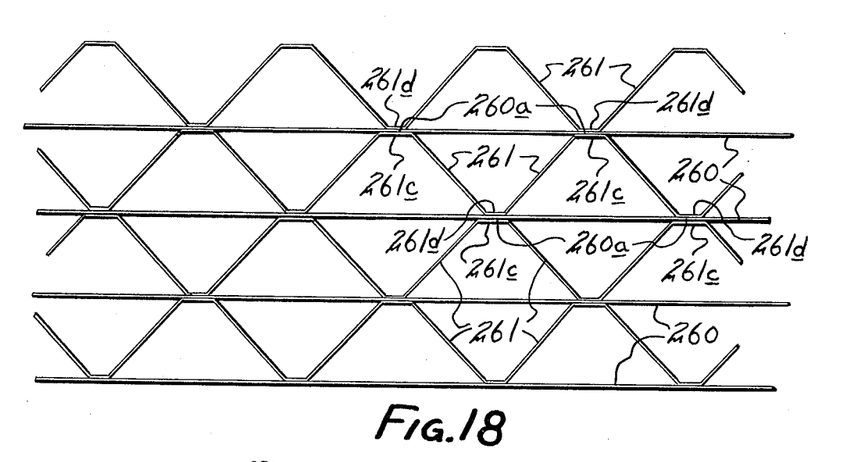
FIG. 18 is a schematic of fragmentary honeycomb core of another specific cell configuration which may be welded by the apparatus of the invention.

FIGS. 17 and 18 indicate that other specfic forms of resistance welded material other than hereinabove described may be fabricated by the method and means embodying the invention. It is noted that in FIG. 17 that a flat web 250 is alternated with a corrugated web 251. The node 251c of a lower corrugated web 251 is welded to the flat web 250 as at 250$^a$ and the node 251$^d$ of an upper corrugated web 251 is welded to the flat web 250 as at 250$^b$. The two nodes 250$^a$ and 250$^b$ of the flat web 250 are spaced equidistantly apart as seen in FIG. 17.

In FIG. 18 alternate flat and corrugated webs 260 and 261 respectively are arranged differently than shown in FIG. 17 in that the flat web 260 is sandwiched between the two welding nodes 261$^d$ and 261$^c$ as at 260$^a$ so that the weld is applied through the thickness of three webs.

Figure 19:
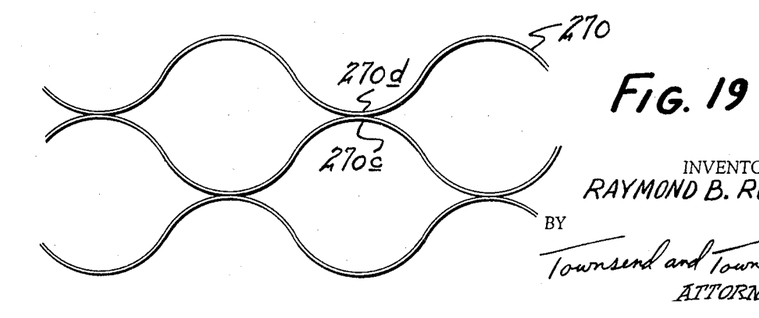
FIG. 19 is a schematic of fragmentary honeycomb core of another specific cell configuration which may be welded by the apparatus of the invention.

In FIG. 19 core is formed by a modified corrugated web strucure in which metal ribbons or webs 270 are formed in sinusoidal curves to form alternately facing welding nodes 270$^d$ and 270$^c$.

Figure 20:
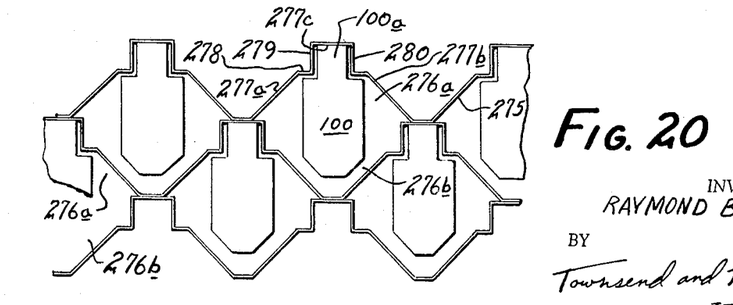
FIG. 20 is a schematic of fragmentary honeycomb core of still another specific cell configuration which may be welded by the apparatus of the invention in which the corrugations of the web material are formed to provide positive registration with the web supporting fingers.

In FIG. 20 still another core configuration is arranged substantially similar to the core configuration shown in FIGS. 1 through 4. In the core structure of FIG. 20, a ribbon or web 275 defines a plurality of longitudinally extending half cells as indicated at 276$^a$ and 276$^b$ respectively formed with three angularly disposed legs 277$^a$, 277$^b$ and 277$^c$ defining a truncated apex in plan with the middle leg 277$^c$ of each half cell defining a flat welding node. The cell walls 277$^a$ and 277$^b$ of each half cell form the primary wall surfaces of each half cell. The legs 277$^a$ and 277$^b$ each bend inwardly as at 278 and thence upwardly as at 279 to form two secondary rigidifying surfaces disposed angularly relative to the median plane of the primary surfaces 277$^a$ and 277$^b$ and arranged to define a substantially U-shaped electrode finger engaging recess indicated generally at 280. It is noted in FIG. 20 that the finger engaging recess 280 is substantially similar in shape to the flat topped trunk 100$^a$ of the fingers 100. By this means when ribbon or web 275 is placed on top of the fingers 100 the finger engaging U-shaped recess 280 of the web forms a cup which engages with the top trunk 100$^a$ to form a positive registration of welding node 277$^c$ with the trunk 100$^a$.

Figure 24:
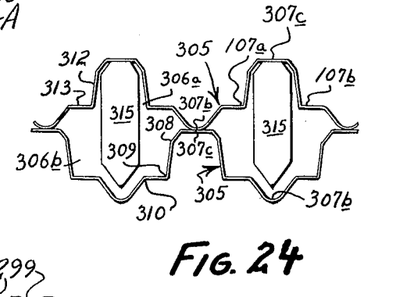
FIG. 24 is a sectional view of a still further modified honeycomb cell configuration.

In FIG. 24 a further core configuration is provided in which ribbons or webs 305 are superposed one to the other to form upper half cells 306$^a$ and lower half cells 306$^b$. Each web 305 is formed to provide oppositely facing welding nodes 307$^d$ and 307$^c$ with primary surfaces 307$^a$ and 307$^b$ joining the two nodes. Each web primary surface is deformed to provide at least three bends as at 308, 309 and 310 which form secondary surfaces 312 and 313 extending inwardly from primary surface 307$^a$ and 307$^b$ of half cells 306$^a$ and outwardly from half cells 306$^b$. The secondary surface 312 of the top half cells 206$^a$ are arranged to guide and align the top web 305 on welding electrodes 315 disposed within the cells during welding. In this type of cell configuration it is noted that each secondary surface and the straight stretches of primary surface are approximately of the same length to provide for greater uniformity of cell structure.

The cell configuration of FIG. 20 and FIGURE 24 because of the corrugation provided in the primary walls provides a means for inducing greater flexibility in the cell structure and also provides a positive registration between the web and the electrode fingers.

Figure 22:
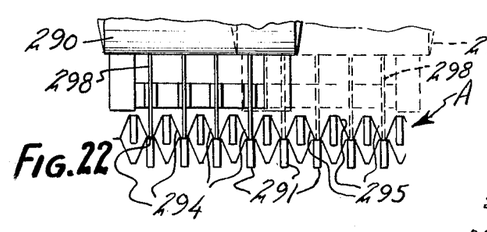
FIG. 22 is a schematic of a modification of the welding apparatus of the invention in which the apparatus of arranged to weld relatively long lengths of metal web by shifting the carriage to a plurality of positions.

Referring now to FIG. 22 it is apparent in some applications it is desirous to weld extremely long ribbons to form honeycomb structure. Obviously the number of welded nodes in the embodiment described in FIGS. 5 et seq. could be increased upon adding additional welding wheels and finger electrodes. It is also contemplated to be within the scope of the invention to provide a structure in which only the number of finger electrodes is increased and the length of the ribbon is extended. The welding wheels are then provided with an arrangement to shift the wheels and the wheel registering assembly transversely of the fingers and nodes so that the carriage is arranged to longitudinally traverse a first group of welding nodes and then is arranged to transversely move to a second position to weld a second group of nodes and possibly even thence to a third position to weld a third group of nodes.

In FIG. 22 it is observed that there is provided a carriage 290 having welding wheels 298 and welding wheel registering mechanisms substantially similar to those shown in FIGS. 5 et seq. Electrode fingers 291 are provided in combination with a finger moving mechanism similar to the finger 100 and mechanisms shown in FIGS. 5 et seq. except that they are extended in number to provide for additional length of web. It is seen that the carriage mechanism 290 after making a pass through a first group of cells indicated as at 294 is arranged to transversely move to align with a second group of cells indicated as at 295. Thus a honeycomb cell structure is welded which is twice as long as the distance between the welding wheels of carriage 290.

Figure 23:
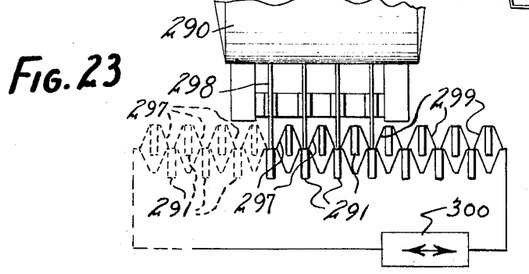
FIG. 23 is a schematic of another modification of the invention in which realtively long lengths of metal web may be welded by transversely shifting the web supporting means to a plurality of positions.

In FIG. 23 there is provided a mechanism identical to the mechanism for FIG. 22 except that the carriage 290 is arranged in a transversely fixed position and a mechanism 300 is arranged to move the fingers 191 transversely so that in a first position the carriage 290 is aligned with its wheels 298 in alignment with a group of nodes designated as 297 and in a second position in alignment with a group of nodes designated as 299. Thus as in the embodiment shown in FIG. 22 the length of the honeycomb A is twice the length of the distance between the wheels on carriage 290.

In both the embodiments of FIG. 22 and FIG. 23 the welding wheels 298 are arranged to align with the fingers supporting the nodes to be welded and the fingers 291 are arranged to withdraw and change relative vertical positions substantially in the manner as described above in connection with FIGS. 11A through H. It is also noted that in the description of the welding carriage that the welding wheels of FIGS. 5 et seq. are described as moving transversely to align with respective welding nodes. It is also to be understood that a mechanism could be employed to transversely move the fingers 100 so that there is obtained relative alignment between fingers and wheels even though the wheels are transversely moved.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Means for making a unitary resistance welded honeycomb structure from at least two webs of metal each defining first and second oppositely facing welding nodes, and wherein said webs are superposed one to the other with the first nodes of the first web resistance welded to the second nodes of the second web disposed above the first web comprising: first and second sets of parallel equidistantly spaced electrode fingers; the fingers of the first set disposed in staggered parallel relation to the fingers of the second set; the spacing between the center points of the fingers of each set being equal to the spacing between the center points of adjacent first nodes of the web; a work area in which the unwelded webs are superposed one to the other with the first nodes of the first web in contact with the second nodes of the second web; said sets of fingers independently positionable in said work area with each set of fingers disposed to alternately support the first nodes of the first web and the first nodes of the second web; a third set of electrodes comprising a plurality of aligned electrode wheels spaced in alignment with the fingers of the set of electrode fingers supporting the first nodes of the first web, and longitudinal wheel moving means to move said wheels longitudinally of said finger electrodes with each wheel traversing along a respectively associated second welding node of the second web; means to transversely move said welding wheels to a first position in alignment with the first set of fingers and to a second position in alignment with the second set of fingers; control means to cause said wheel moving means to move said wheels to the first position while said first set of fingers is in supporting position with the first nodes of the first web and to the second position while said second set of fingers is in supporting position with the first nodes of the first web, whereby said wheels are always disposed in alignment with the set of electrode fingers supporting the first node of the first web; said longitudinal wheel moving means operable to move said wheels in and out of the vertical plane of said work area; vertical wheel moving means to raise said welding wheels to an upper position above said webs and to a lower position with the wheels arranged with the rim of each wheel biased against a second node of the second web; said last named wheel raising means operable to maintain the wheels in lower position while the wheels are within the vertical plane of the work area and to raise the wheels while the wheels are out of the vertical plane of the work area; means for establishing a welding circuit through said first and second webs between said third electrode and said set of electrode fingers supporting the first nodes of the first web to cause resistance welding of said second nodes of said second web with the first nodes of said first web; and a resilient roller mounted rotatably on an axis parallel to the axis of rotation of the welding wheels with the periphery of said roller in contact with the rim of each wheel to resiliently urge said wheels against the web under substantially uniform welding pressure.

2. The combination of claim 1 and wherein welding wheel mounting means are mounted for movement relatively toward and away from said roller and wherein said welding wheels are rotatably mounted on and are carried by said mounting means, said welding wheel mounting means normally biased downwardly out of biasing contact with said rollers when said welding wheels are in their upper position, to free said welding wheels from contact with said roller, to permit transverse movement of said wheel by said moving means relative to said fingers and said roller.

3. In a welding apparatus of the type including rotatably mounted welding wheel electrodes operable to traverse webs on a work piece, the combination of: a plurality of welding wheels mounted rotatably about separate axes of rotation; a unitary resilient roller mounted rotatably on an axis parallel to the axis of rotation of the welding wheels with the periphery of said roller in frictional contact with the rim of each wheel to resiliently urge said wheels to uniformly rotate against the webs under substantially uniform welding pressure.

4. In a welding apparatus of the type including at least two rotatably mounted welding wheel electrodes operable to traverse webs on a work piece; the combination of means to rotatably mount said welding wheels on a floating vertical axis; a resilient roller mounted rotatably on an axis paralleling the axis of rotation of the welding wheels; means biasing said roller to engage the rim of said wheel to resiliently urge each said wheel against the webs under substantially uniform welding pressure.

5. In a welding apparatus of the type including rotatably mounted welding wheel electrodes operable to resistance weld metal webs on a work piece during relative movement of the welding wheels with respect to the webs on the work piece the combination of: a resilient roller mounted rotatably over the work piece; welding wheels disposed between said roller and work piece; means to rotatably mount said wheels on an axis paralleling the axis of rotation of said roller while holding the axis of rotation of said wheels unrestrained against relative movement between said roller and said work piece; means biasing said roller against said wheels to force said wheels against said work piece under substantially uniform loading and under sufficient frictional contact to cause uniform torque loading between said wheels and said roller.

References Cited by the Examiner

UNITED STATES PATENTS

| | | | |
|---|---|---|---|
| 1,234,365 | 7/1917 | Makowski | 219—81 |
| 1,300,603 | 4/1919 | Gravell | 219—81 |
| 1,664,030 | 3/1928 | Gravell | 219—81 |
| 2,288,184 | 6/1942 | Dodson et al. | 219—83 |
| 2,381,742 | 8/1945 | Guirl | 219—102 |
| 2,747,064 | 5/1956 | Van Pappelendam | 219—78 |
| 2,780,716 | 2/1957 | Wasilisin et al. | 219—82 |
| 2,789,203 | 4/1957 | Pigo et al. | |
| 2,843,722 | 7/1958 | Wegeforth. | |

JOSEPH V. TRUHE, *Primary Examiner.*

ANTHONY BARTIS, *Examiner.*

MAX L. LEVY, *Assistant Examiner.*